United States Patent
Schroeder et al.

(10) Patent No.: US 9,246,407 B2
(45) Date of Patent: Jan. 26, 2016

(54) VOLTAGE BALANCING SYSTEM AND METHOD FOR MULTILEVEL CONVERTERS

(71) Applicant: GENERAL ELECTRIC COMPANY, Schenectady, NY (US)

(72) Inventors: Stefan Schroeder, Munich (DE); Qingyun Chen, Munich (DE)

(73) Assignee: General Electric Company, Niskayuna, NY (US)

( * ) Notice: Subject to any disclaimer, the term of this patent is extended or adjusted under 35 U.S.C. 154(b) by 368 days.

(21) Appl. No.: 13/853,335

(22) Filed: Mar. 29, 2013

(65) Prior Publication Data

US 2014/0293667 A1    Oct. 2, 2014

(51) Int. Cl.
H02M 7/00 (2006.01)
H02M 7/483 (2007.01)
H02M 1/00 (2007.01)
H02M 7/487 (2007.01)

(52) U.S. Cl.
CPC .............. *H02M 7/483* (2013.01); *H02M 7/487* (2013.01); *H02M 2001/0009* (2013.01); *H02M 2001/0012* (2013.01)

(58) Field of Classification Search
CPC ............................ H02M 7/483; H02M 7/487
USPC .......................................... 363/59, 60, 65, 71
See application file for complete search history.

(56) References Cited

U.S. PATENT DOCUMENTS

| 5,642,275 | A | 6/1997 | Peng et al. | |
|---|---|---|---|---|
| 6,349,044 | B1 * | 2/2002 | Canales-Abarca et al. | 363/17 |
| 7,599,167 | B2 | 10/2009 | Doljack | |
| 7,612,537 | B2 | 11/2009 | Wynne et al. | |
| 8,144,491 | B2 | 3/2012 | Bendre et al. | |
| 8,232,806 | B2 | 7/2012 | Kawamura | |
| 8,264,273 | B2 | 9/2012 | Macfarlane | |
| 2012/0068756 | A1 | 3/2012 | Aiello et al. | |
| 2012/0218795 | A1 | 8/2012 | Mihalache | |
| 2013/0314957 | A1 * | 11/2013 | Gupta et al. | 363/71 |
| 2013/0343103 | A1 * | 12/2013 | Takizawa | 363/53 |
| 2014/0376387 | A1 * | 12/2014 | Shin | 370/245 |

FOREIGN PATENT DOCUMENTS

WO    0213364 A1    2/2002

OTHER PUBLICATIONS

European Search Report and Written Opinion issued in connection with corresponding EP Application No. 14162389.2-1809 on Oct. 9, 2014.

(Continued)

*Primary Examiner* — Matthew Nguyen
(74) *Attorney, Agent, or Firm* — Nitin N. Joshi

(57) ABSTRACT

A method of operating a flying capacitor multilevel converter having a direct current link and a plurality of phase legs each having a plurality of flying capacitors includes employing redundant states to balance flying capacitor voltages by charging or discharging flying capacitors. The redundant states are employed by obtaining a load current of the flying capacitor multilevel converter. If a load current value is lower than a threshold value then a capacitor current of a phase terminal capacitor is utilized to determine redundant states else a load current direction is utilized to determine the redundant states.

20 Claims, 5 Drawing Sheets

(56) References Cited

OTHER PUBLICATIONS

Zhang, L. et al, "Capacitor voltage balancing in multilevel flying capacitor inverters by rule-based switching pattern selection", IET Electric Power Applications, May, 2007, vol. 1, Issue No. 3, pp. 339-347.

Escalante G., Miguel F. et al, "Direct Approach for Balancing the Capacitor Voltages of a 5-Level Flying Capacitor Converter", 8th European Conference on Power Electronics and Applications, Sep. 1999, vol. Conf. 8, pp. 1-8.

Feng, Chunmei et al, "Modified Phase-Shifted PWM Control for Flying Capacitor Multilevel Converters", IEEE Transactions on Power Electronics, Institute of Electrical and Electronics Engineers, USA, Jan. 2007, vol. 22, Issue No. 1, pp. 178-185.

Shukla et al., "Capacitor Voltage Balancing Schemes in Flying Capacitor Multilevel Inverters", Power Electronics Specialists Conference, IEEE, Jun. 17-21, 2007, pp. 2367-2372.

Shukla et al., "Natural Balancing of Flying Capacitor Voltages in Multicell Inverter Under PD Carrier-Based PWM", IEEE Transactions on Power Electronics, Jun. 2011, vol. 26, Issue 6, pp. 1682-1693.

Defay et al., "A Predictive Control With Flying Capacitor Balancing of a Multicell Active Power Filter", IEEE Transactions on Industrial Electronics, Sep. 2008, vol. 55, Issue 9, pp. 3212-3220.

M. Schweizer et al., "Design and Implementation of a Highly Efficient three-Level T-Type Converter for Low-Voltage Applications," IEEE Transactions on Power Electronics, vol. 28, No. S2, Feb. 2013, pp. 899-907.

* cited by examiner

VOLTAGE BALANCING SYSTEM AND METHOD FOR MULTILEVEL CONVERTERS

BACKGROUND

Embodiments of invention relates to multilevel converters and more specifically to a system and method for voltage balancing in multilevel converters.

Multilevel converters are generally used in high power industrial applications such as variable speed drive (VSD) systems or in energy conversion applications such as a solar (or photovoltaic) power generation systems, wind turbine generators and high voltage direct current (HVDC) transmission systems. One example of a multi-level converter is a flying capacitor (FC) multilevel converter. The flying capacitor multilevel converter includes a number of capacitors referred to as flying capacitors. The flying capacitors are charged to various voltage levels and by changing switching states the flying capacitors and a dc source are connected in different ways and produce various line-to-neutral output voltages.

Voltage balancing of flying capacitors is a challenge when operating the flying capacitor multilevel converter. Flying capacitors voltage unbalance (i.e., unequal voltages across flying capacitors) may overstress the capacitors and switching devices and cause over voltage and under voltage trips during the operation of the converter. Flying capacitors voltage unbalance also causes an increase in output voltage total harmonic distortion (THD) and may cause the control loop to become unstable.

One of the known solutions utilized to balance voltages of flying capacitors uses additional balancing circuitry. However, the balancing circuitry adds cost, losses, volume to the flying capacitor multilevel converter and also needs to be designed carefully.

Therefore, it is desirable to provide a method and a system that will address the foregoing issues.

BRIEF DESCRIPTION

In accordance with an embodiment of the present invention, a method of operating a flying capacitor multilevel converter including a direct current link and a plurality of phase legs each having a plurality of flying capacitors is provided. The method includes employing redundant states to balance flying capacitor voltages by charging or discharging flying capacitors. Employing redundant states includes obtaining a load current of the flying capacitor multilevel converter and utilizing a capacitor current of a phase terminal capacitor to determine redundant states when a load current value is lower than a threshold value. When the load current value is higher than the threshold value a load current direction is utilized to determine redundant states.

In accordance with another embodiment of the present invention, a multi-level converter system comprising a converter including a direct current link and a plurality of phase legs each having a plurality of flying capacitors and a converter controller is provided. The converter controller is configured to employ redundant states to balance flying capacitor voltages by charging or discharging the plurality of flying capacitors. The converter controller employs redundant states by utilizing a capacitor current of a phase terminal capacitor to determine redundant states when a load current value is lower than a threshold value and utilizing a load current direction to determine redundant states when the load current value is higher than the threshold value.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
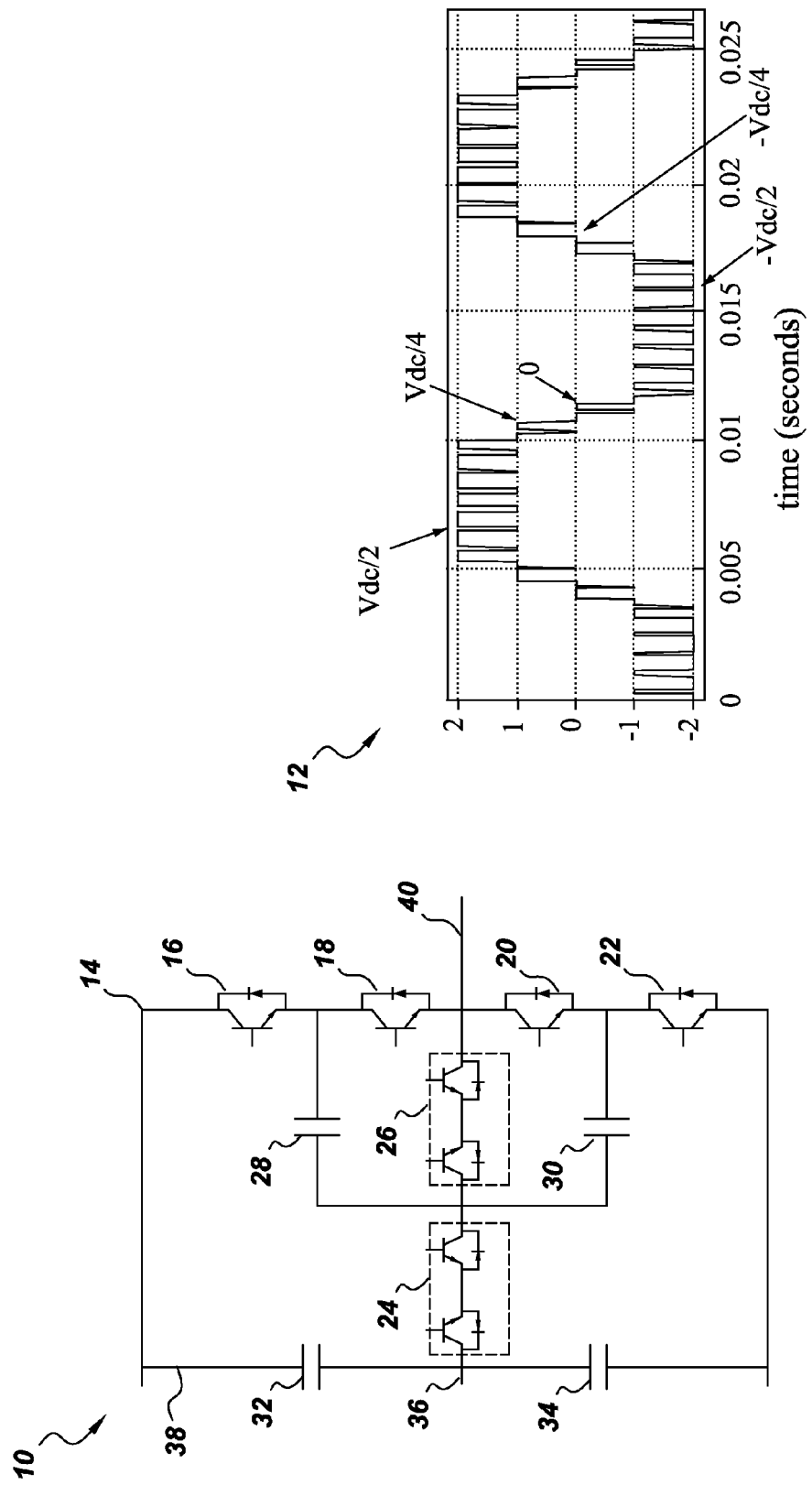
FIG. 1 is a schematic diagram of one leg of an exemplary flying capacitor multilevel converter and its output waveform for use in accordance with an embodiment of the present technique.
Figure 2:
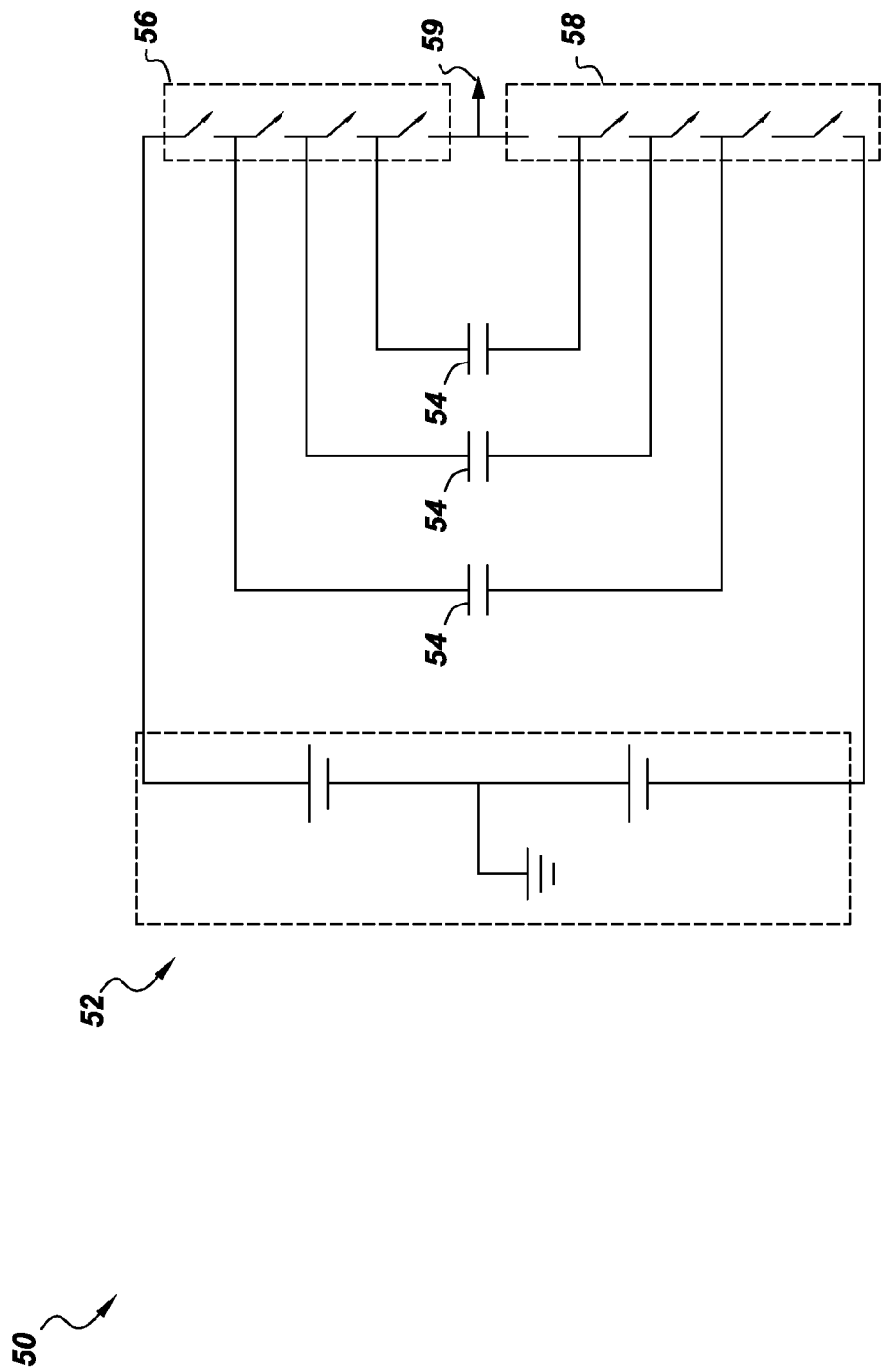
FIG. 2 is a schematic diagram of one leg of an another flying capacitor multilevel converter for use in accordance with an embodiment of the present technique

FIG. 1 illustrates a schematic 10 of one leg or one phase of an exemplary flying capacitor (FC) multilevel converter and its output waveform 12. It should be noted that schematic 10 is only an example of the flying capacitor multilevel converter and other variations of flying capacitor multilevel converter such as one shown in FIG. 2 are well within the scope of the present technique. One leg 14 of the flying capacitor multilevel converter includes four unidirectional switching devices 16, 18, 20, and 22, two bidirectional switching devices 24 and 26 and two flying capacitors 28 and 30. In one embodiment, two direct current (DC) link capacitors 32 and 34 are controlled each to have a voltage about equal to Vdc/2, where Vdc is the total DC link voltage. An output phase voltage Van of leg 14 is measured between a center point or a neutral point 36 of a DC link 38 and a phase terminal 40. As shown in output waveform 12, output phase voltage Van has five voltage levels, two positive voltage levels (Vdc/2 and Vdc/4), one zero voltage level (0) and two negative voltage levels (−Vdc/2 and −Vdc/4). Since the output phase voltage Van has five levels, this converter is called as a five level converter. It should be noted that in this embodiment, an output line-to-line voltage (i.e., a voltage between two phase terminals) will have nine voltage levels.

In the schematic 10, if voltage across flying capacitors 28 and 30 are not equal to Vdc/4 then it may result in unequal voltage steps in the output phase voltage. Generally, the switching devices 18, 20 and 26 are also rated assuming the voltage across flying capacitors 28 and 30 to be Vdc/4. Now when the voltage across the flying capacitor 28 or 30 becomes higher than Vdc/4, switching devices 18, 20 and 26 may also see higher voltages across them (i.e., they will be overstressed). Thus, in one embodiment of the present technique a control system and method is disclosed to balance the voltages across flying capacitors in a flying capacitor multilevel converter.

FIG. 2 illustrates a schematic diagram of one leg or one phase 50 of another flying capacitor multilevel converter for use in accordance with an embodiment of the present technique. In this embodiment, one leg 50 of the flying capacitor multilevel converter includes a DC link 52, flying capacitors 54, top switching devices 56 and bottom switching devices 58. An output phase voltage measured at phase terminal 59 will have five voltage levels, two positive voltage levels (Vdc/2 and Vdc/4), one zero voltage level (0) and two negative voltage levels (−Vdc/2 and −Vdc/4) obtained with various switching combination of top and bottom switching devices 56 and 58 respectively.

Figure 3:
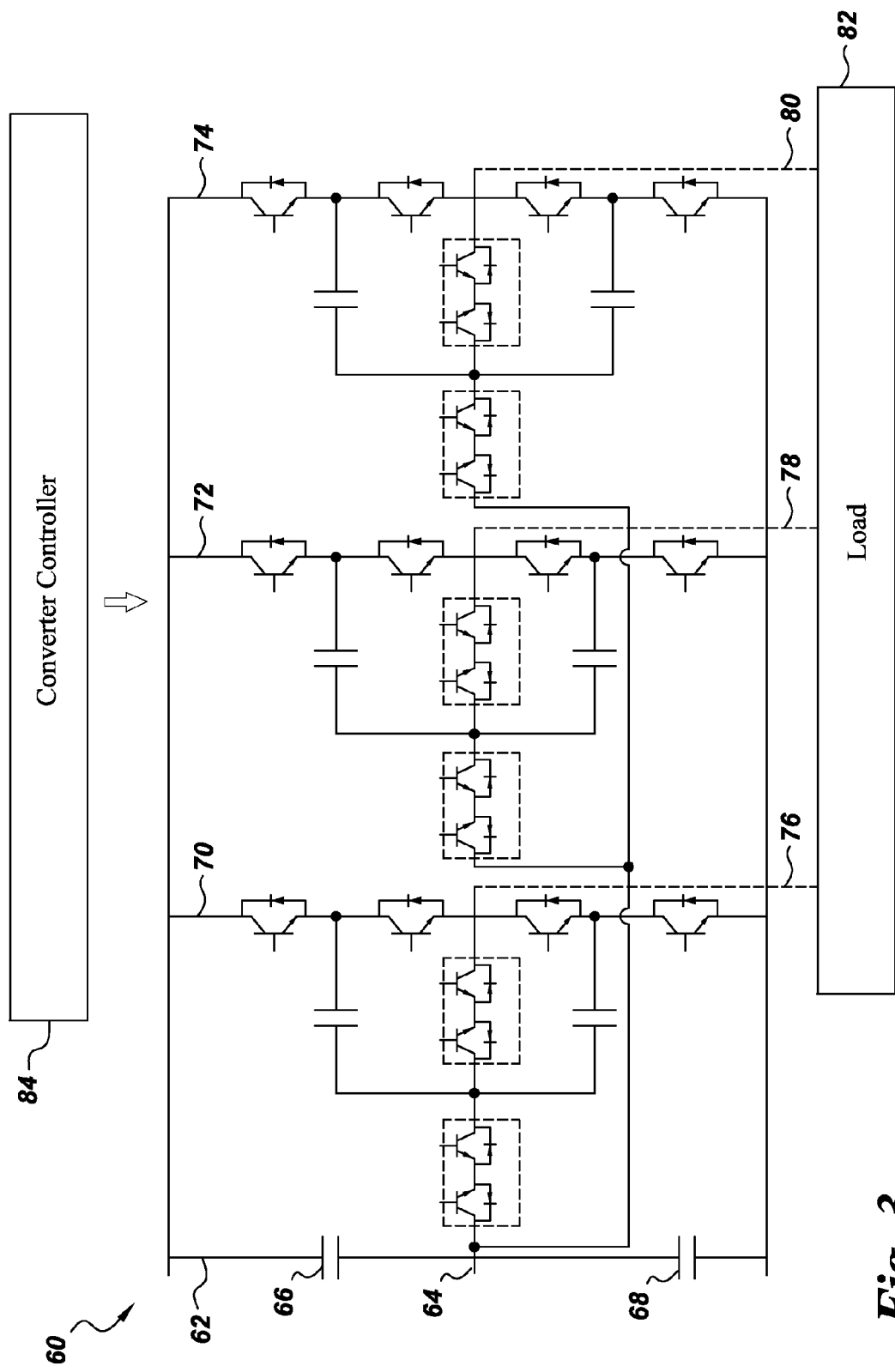
FIG. 3 is a schematic diagram of a flying capacitor three phase five level converter for use in accordance with an embodiment of the present technique.

FIG. 3 illustrates a schematic of a flying capacitor three phase five level converter 60 for use in accordance with an embodiment of the present technique. In general, converter 60 is a three phase representation of the converter shown in FIG. 1. The converter 60 includes a split DC link 62 with a neutral point 64 and capacitors 66 and 68 and three switching legs 70, 72, and 74 with three phase terminals 76, 78, and 80 respectively (for phases a, b, and c). A three phase load 82 is connected across the three phase output terminals 76, 78, and 80. A converter controller 84 provides switching pulse commands to switching devices of the switching legs 70, 72, and 74 based on various inputs (not shown) such as a reference three phase voltage, a phase current direction, a DC link voltage and flying capacitor voltages, for example. In one embodiment, the term "controller" refers to any combination of software and hardware elements, or any system, process, or functionality that performs or facilitates the processes described herein. As described earlier, the output phase voltages at phase terminals 76, 78, and 80 will have five levels, namely Vdc/2, Vdc/4, 0, −Vdc/4 and −Vdc/2.

Figure 4:
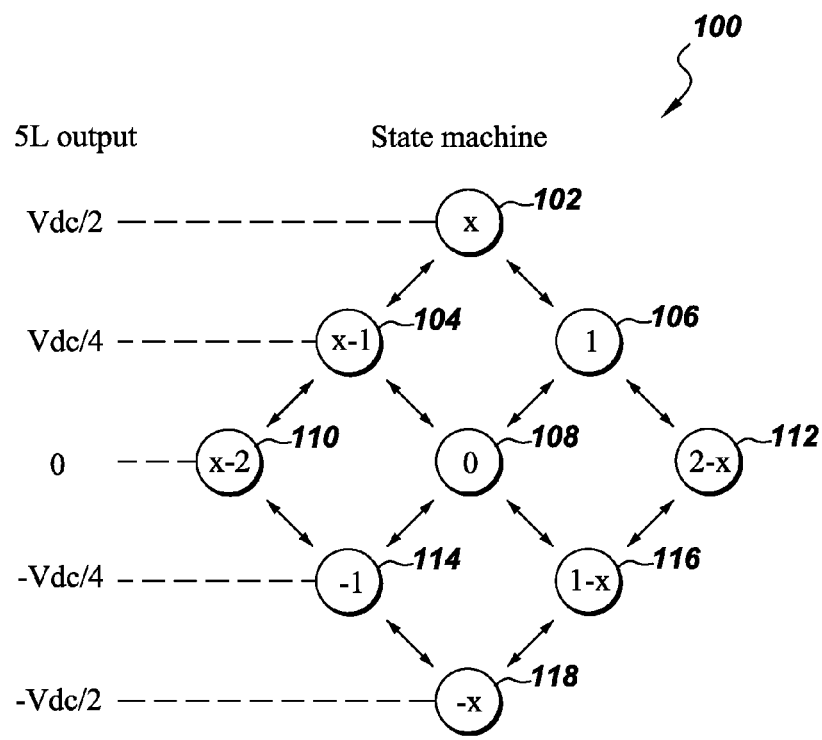
FIG. 4 is a state machine diagram for controlling the operation of one leg of a flying capacitor five level converter in accordance with an embodiment of the present technique.

FIG. 4 illustrates a state machine diagram 100 for controlling the operation of one leg 14 (FIG. 1) of the flying capacitor five level converter in accordance with an embodiment of the present technique. In one embodiment, state machine 100 may be employed by converter controller 84. State machine 100 includes two switching states 102 and 118 for the two output voltage levels Vdc/2 and −Vdc/2 respectively. Furthermore, there are two switching states each (104, 106 and 114, 116) for the two output voltage levels Vdc/4 and −Vdc/4. In other words, switching states 104 and 106 are redundant and either one of them can be utilized to obtain the output voltage level Vdc/4. Similarly, switching states 114 and 116 are redundant and can be utilized to obtain the output voltage level −Vdc/4. For the zero (0) output voltage level there are three redundant switching states 108, 110 and 112. In each state, flying capacitors 28 and 30 may get charged, discharged or remain unchanged depending on a current direction. If the charging and discharging of flying capacitors is not regulated properly then it will result in unbalanced voltages across them. Flying capacitors voltage unbalance may overstress the capacitors and switching devices and an increase in output voltage total harmonic distortion (THD) and may cause the control loop to become unstable. In one embodiment, the selection of the redundant switching states depends on whether to charge the flying capacitor or to discharge the flying capacitor.

In another embodiment, for a given switching state, if the flying capacitor charge state remains unchanged then other redundant switching states for that voltage level are not considered. For example, for the zero output voltage level, only state 108 needs to be utilized as state 108 neither charges nor discharges flying capacitors.

The switching states corresponding to positive, negative and zero output voltage of state machine 100 and related switching positions of switching devices in the leg 114 are given below in Table 1. Table 1 also provides information about whether flying capacitors 28, 30 (FIG. 1) will get charged (+), discharged (−) or remain unchanged (*) for a given switching state when a phase current is flowing out of the converter (i.e., the phase current coming out from phase terminal 40). When the phase current direction is opposite (i.e., the phase current is flowing into the converter or to phase terminal 40) then charging or discharging state of the capacitor reverses. In other words, when the phase current direction reverses, the capacitor that is getting charged starts discharging, the capacitor that is getting discharged starts charging and that capacitor that is remaining unchanged remains unchanged. In one embodiment of the present technique, the phase current may be a load current of the converter if it exceeds a threshold value or the phase current may be a phase terminal capacitor charging current if it does not exceed the threshold values as will be described subsequently. For zero output voltage level, only one switching state 108 which neither charges nor discharges flying capacitors is shown.

TABLE 1

| Switching State | Switching Device (S.D.) 16 | S.D. 18 | S.D. 20 | S.D. 22 | S.D. 24 | S.D. 26 | Output Vtg | Cap 28 | Cap 30 |
|---|---|---|---|---|---|---|---|---|---|
| 102 | ON | ON | OFF | OFF | OFF | OFF | +Vdc/2 | * | * |
| 104 | ON | OFF | OFF | OFF | OFF | ON | +Vdc/4 | + | * |
| 106 | OFF | ON | OFF | OFF | ON | OFF | +Vdc/4 | − | * |
| 108 | OFF | OFF | OFF | OFF | ON | ON | zero | * | * |
| 114 | OFF | OFF | ON | OFF | ON | OFF | −Vdc/4 | * | + |
| 116 | OFF | OFF | OFF | ON | OFF | ON | −Vdc/4 | * | − |
| 118 | OFF | OFF | ON | ON | OFF | OFF | −Vdc/2 | * | * |

As can be seen from Table 1, for an outgoing phase current, 2 redundant switching states each for output voltage levels +Vdc/4 and −Vdc/4 may be utilized as per the charging or discharging requirements of flying capacitors. For zero output voltage level only one switching state (108) is utilized as it doesn't result in any charging or discharging of the flying capacitors. However, in another embodiment, other redundant switching states for zero voltage level may also be employed to meet charging or discharging requirements of the flying capacitors. As discussed earlier, for incoming phase current, charging and discharging of flying capacitors merely reverses. During normal operation, i.e., when the phase current is the load current, redundant switching states are utilized to balance the flying capacitor voltages with the help of the load current. However, when there is no load or low load on the converter, utilizing the load current to charge or discharge the flying capacitors and hence to balance the flying capacitor voltages is a challenge. In accordance with an embodiment of the present technique, a control system which utilizes a current in a phase terminal capacitor (e.g., filter capacitor or stray capacitance at output terminals of the converter) is utilized to balance flying capacitor voltages at no load or low load conditions.

Figure 5:
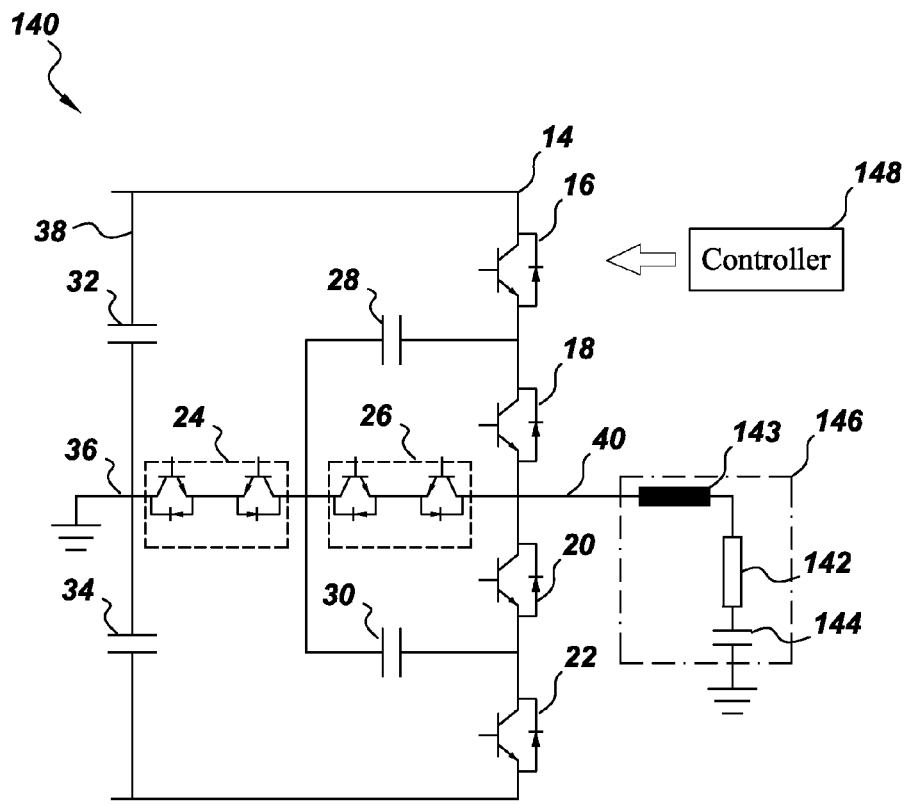
FIG. 5 is a circuit diagram of one leg of a flying capacitor multilevel converter with a phase terminal capacitor for use in accordance with an embodiment of the present technique.

FIG. 5 shows a circuit diagram 140 of one leg of a flying capacitor multilevel converter with a phase terminal capacitor 144. In one embodiment, phase terminal capacitor 144 may be part of an output filter 146 which also includes a resistor 142 and an inductor 143. In another embodiment, an additional or a dedicated capacitor may also be added at the phase terminal. In yet another embodiment, phase terminal capacitor 144 may not be a separate component attached to the converter rather it may just be a capacitor formed due to stray capacitance at the phase terminal, e.g. capacitances of the attached cable or the motor windings. In other words, the phase terminal capacitor 144 may be defined as either a filter capacitor, an additional capacitor or a stray capacitance formed at phase terminals of the converter. In accordance with an embodiment of the present technique, phase terminal capacitor 144 charging or discharging current is utilized to determine appropriate switching states in Table 1 to balance flying capacitor voltages during low load or no load conditions.

In general, a time constant of phase terminal capacitor 144 is much smaller than a carrier period. The time constant refers to a time taken by a capacitor to charge to 63% of a step voltage and the carrier period refers to a time period of one switching cycle (i.e., carrier period=1/switching frequency). Thus, phase terminal capacitor 144 can charge or discharge within one switching cycle. In an embodiment of the present technique, this charging and discharging current of phase terminal capacitor 144 is utilized to determine redundant states to balance the flying capacitor voltages during low load or no load currents.

A charge Q needed for phase terminal capacitor 144 to reach a level of Vstep is given by Q=Vstep×Cs, where Vstep is a step voltage applied across filter 146 in volts and Cs refers to capacitance value of capacitor 144 in Farads. The charge Q is measured in Coulombs and the sign of the charge Q depends on the sign of Vstep, i.e. whether the voltage Vstep is going up or down. Furthermore, the value of Vstep depends on voltage at phase terminal 40 of the converter. The value of Vstep and whether it is going up or down is known by a controller 148 which is determining the switching states for the converter. In other words, controller 148 determines the expected voltage at phase terminal of the multilevel converter from a reference voltage value it receives as an input and then based on the expected voltage determines a direction of a phase current. Finally, controller 148 utilizes the direction of the phase current to decide on the redundant switching state that will balance the flying capacitor voltages.

A voltage deviation $\Delta V_{fc}$ of a flying capacitor $C_{fc}$ in relation to phase terminal capacitor Cs will be given by following equation:

$$\Delta V_{fc} = C_s * \Delta V_{phase} / C_{fc} \qquad (1)$$

In other words, the voltage deviation $\Delta V_{fc}$ of the flying capacitor $C_{fc}$ is directly proportional to the capacitance value of the phase terminal capacitor 144 and a deviation in an output phase voltage $V_{phase}$ (or Vstep) whereas it is inversely proportional to the capacitance value of the flying capacitor $C_{fc}$. Thus, the higher the flying capacitor capacitance value the lower the voltage deviation $\Delta V_{fc}$ of the flying capacitor $C_{fc}$.

As an example, assume that the voltage $V_{phase}$ at phase terminal 40 of the converter is 0 volts. Thus, phase terminal capacitor 144 is also charged to 0 volts. Now if expected phase voltage $V_{phase}$ is to be changed from 0 to Vdc/4 as per a reference voltage requirement of the converter then at no load or low load, phase terminal capacitor 144 needs to charge so that it can reach the voltage level of Vdc/4. Thus, controller 148 determines that since phase terminal capacitor 144 needs to charge, the current at phase terminal 40 may flow out of the converter. Now from table 1, it is known that for outgoing phase current and for voltage level Vdc/4 there are two redundant switching states 104 and 106. However, from Table 1, it is also known that state 104 results in charging of flying capacitor 28 whereas state 106 results in discharging of flying capacitor 28. Thus, if a flying capacitor voltage sensor (not shown) senses that flying capacitor 28 is overcharged then switching state 106 will be selected by controller 148 else switching state 104 will be selected.

As discussed above, the present technique utilizes a load current direction during normal conditions and a phase terminal capacitor current direction during no load or low load currents to decide on redundant switching states to balance the flying capacitor voltages. In one embodiment, a threshold current value is utilized to differentiate between the normal condition and the low load or the no load current. In one embodiment, the threshold current value is decided by equating a charge Q of phase terminal capacitor 144 which is given by Vstep*Cs with a charge $Q_{load}$ that may be generated by a threshold load current $I_{threshold}$. The charge $Q_{load}$ load from threshold load current $I_{threshold}$ may be given as $Q_{load}=I_{threshold}*d/fc$, where fc is a switching frequency and d is a duty cycle. The value of d may be an actual value or an average value or a value determined by an operator. Now equating $Q_{load}$ and Q provides:

$$I_{threshold}*d/fc = V\text{step}*Cs \qquad (2)$$

$$I_{threshold} = V\text{step}*Cs*fc/d \qquad (3)$$

Thus, the threshold current value depends on a phase terminal capacitance value, voltage at the phase terminal of the converter and switching frequency and duty cycle of the flying capacitor multilevel converter. In one embodiment, the load current is compared against this threshold current value and when the load current is lower than the threshold current value, redundant switching states are determined based on the phase terminal capacitor current direction. The deviation of the equations above assumes that the return wires of all capacitors are connected to the dc-link and consequently the total voltage step of an inverter phase is transferred to its respective capacitor. If the return wires of each capacitor are connected to each other but are not connected to the dc-link then only a fraction of the total inverter phase voltage is applied in the respective capacitor, e.g. ⅔ in case of a three-phase system. This factor should be incorporated into equations (2) and (3) in such configuration.

Figure 6:
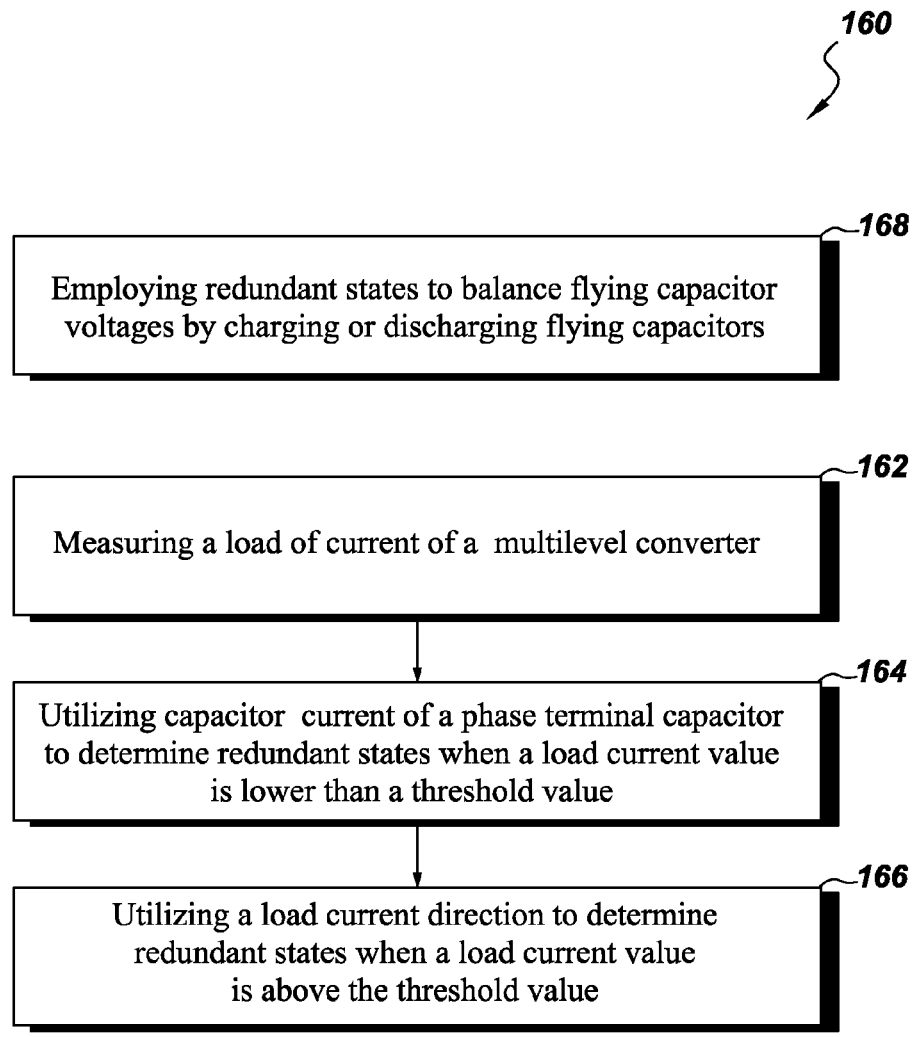
FIG. 6 is a block diagram representing a method of operating a flying capacitor multilevel converter in accordance with an embodiment of the present technique.

FIG. 6 shows a method 160 of operating a flying capacitor multilevel converter in accordance with an embodiment of the present technique. In step 168, the method includes employing redundant switching states so as to balance flying capacitor voltages by charging or discharging flying capacitors. In one embodiment, redundant switching states for a given voltage level refer to the switching states which can be employed in place of each other as they result in the same voltage level. Steps 162 to 166 refer to the steps that may be involved in employing redundant switching states. For example, employing switching states includes measuring a load current of a flying capacitor multilevel converter in step 162. In step 164, a load current value is compared against a threshold value and if the load current value is lower than the threshold value then a capacitor current of a phase terminal capacitor is utilized to determine redundant switching states. In one embodiment, the phase terminal capacitor may be a filter capacitor or in another embodiment, the phase terminal capacitor may be a stray capacitance. In another embodiment, the threshold current value depends on parameters including the phase terminal capacitor value, switching frequency, duty cycle and voltage at the phase terminal of the converter. Utilizing the phase terminal capacitor current comprises first determining the phase terminal capacitor current direction based on an expected voltage transition at a phase terminal of the converter. In one embodiment, if the voltage at the phase terminal of the converter is expected to go from high to low then the phase terminal capacitor current direction is marked as flowing into the phase terminal else the phase terminal capacitor current direction is marked as flowing out of the phase terminal. In step 166, method 160 includes utilizing a load current direction to determine redundant switching states if the load current value is above the threshold value.

The foregoing example or part of foregoing example and method steps may be implemented by suitable computer program code on a processor-based system, such as a general-purpose or special-purpose computer. The computer program code, may be stored or adapted for storage on one or more tangible, machine readable media, such as on memory chips, local or remote hard disks, optical disks (that is, CD's or DVD's), or other media, which may be accessed by a processor-based system to execute the stored code.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating a flying capacitor multilevel converter including a direct current link and a plurality of phase legs each having a plurality of flying capacitors, and a phase terminal capacitor connected across a phase terminal of the phase leg, the method comprising:
    employing redundant states to balance flying capacitor voltages by charging or discharging flying capacitors, wherein employing redundant states include
        obtaining a load current of the flying capacitor multilevel converter;
        utilizing a capacitor current of the phase terminal capacitor to determine redundant states when a load current value is lower than a threshold value; and
        utilizing a load current direction to determine redundant states when the load current value is higher than the threshold value.

2. The method of claim 1, wherein the phase terminal capacitor comprises a filter capacitor or a phase terminal stray capacitance.

3. The method of claim 1, wherein the threshold value is determined based on parameters including a capacitance value of the phase terminal capacitor, a voltage change at a phase terminal of the flying capacitor multilevel converter, and switching frequency and duty cycle of the flying capacitor multilevel converter.

4. The method of claim 1, wherein the threshold value is determined by equating a charge of the phase terminal capacitor with a charge generated by a load current.

5. The method of claim 1, wherein utilizing the capacitor current of the phase terminal capacitor comprises determining a phase terminal capacitor current direction based on an expected voltage transition at a phase terminal of the flying capacitor multilevel converter.

6. The method of claim 5, wherein determining the phase terminal capacitor current direction includes marking the phase terminal capacitor current direction as flowing into the phase terminal if the expected voltage transition is from high to low.

7. The method of claim 5, wherein determining the phase terminal capacitor current direction includes marking the phase terminal capacitor current direction as flowing out of the phase terminal if the expected voltage transition is from low to high.

8. The method of claim 5, wherein the expected voltage transition at a phase terminal of the flying capacitor multilevel converter is determined based on a reference voltage value.

9. The method of claim 1, wherein redundant switching states include at least two switching states which generate equal voltages.

10. The method of claim 9, wherein determination of the redundant state is decided based on charging or discharging requirement of the flying capacitor.

11. The method of claim 1, wherein a time constant of the phase terminal capacitor is smaller than a carrier period.

12. The method of claim 1, wherein the phase terminal capacitor charges or discharges within one switching cycle.

13. A multi-level converter system comprising:
    a converter including a direct current (DC) link and a plurality of phase legs each having a plurality of flying capacitors and a phase terminal capacitor connected across a phase terminal of the phase leg; and
    a converter controller configured to
        employ redundant states to balance flying capacitor voltages by charging or discharging the plurality of flying capacitors, wherein the controller employs redundant states by
            utilizing a capacitor current of the phase terminal capacitor to determine redundant states when a load current value is lower than a threshold value; and
            utilizing a load current direction to determine redundant states when the load current value is higher than the threshold value.

14. The multi-level converter system of claim 13, wherein the phase terminal capacitor comprises a filter capacitor or a phase terminal stray capacitance.

15. The multi-level converter system of claim 13, wherein the threshold value is determined based on parameters including a capacitance value of the phase terminal capacitor, a voltage change at a phase terminal of the flying capacitor multilevel converter, and switching frequency and duty cycle of the flying capacitor multilevel converter.

16. The multi-level converter system of claim 13, wherein the threshold value is determined by equating a charge of the phase terminal capacitor with a charge generated by a load current.

17. The multi-level converter system of claim 13, wherein the controller is configured to utilize the capacitor current of the phase terminal capacitor by determining a phase terminal capacitor current direction based on an expected voltage transition at a phase terminal of the flying capacitor multilevel converter.

18. The multi-level converter system of claim 13, wherein the controller is configured to determine the redundant state based on charging or discharging requirement of the flying capacitor.

19. The multi-level converter system of claim 13, wherein a time constant of the phase terminal capacitor is smaller than a carrier period.

20. The multi-level converter system of claim 13, wherein the phase terminal capacitor charges or discharges within one switching cycle.

* * * * *